United States Patent [19]

Williams et al.

[11] 4,433,574

[45] Feb. 28, 1984

[54] FLOWMETER

[75] Inventors: Anthony P. Williams; Ralph G. Carter, both of Hampshire, England

[73] Assignee: Brandhurst Company Limited, Bucks, England

[21] Appl. No.: 393,607

[22] Filed: Jun. 30, 1982

[30] Foreign Application Priority Data

Jul. 6, 1981 [GB] United Kingdom ............... 8120846

[51] Int. Cl.$^3$ ............................................. G01F 15/08
[52] U.S. Cl. ................................................ 73/200
[58] Field of Search ................. 73/113, 200, 861.77

[56] References Cited

U.S. PATENT DOCUMENTS 3,029,632 4/1962 Nistri .................................. 73/113

4,012,958 3/1977 Taylor .............................. 73/861.77

Primary Examiner—Herbert Goldstein
Attorney, Agent, or Firm—Watson, Cole, Grindle & Watson

[57] ABSTRACT

A flowmeter for measuring flow of fuel to a combustion engine comprises a transducer including a turbine the vanes of which interrupt the light between a light source and a photosensitive device when the turbine rotates, the transducer being mounted with its axis vertical for fuel to flow upwardly past the turbine, a swirl chamber for eliminating gas and vapor bubbles from the fuel before it enters the transducer, and a non-return valve to prevent reverse flow of fuel through the transducer.

13 Claims, 5 Drawing Figures

FLOWMETER

This invention relates to a device for measuring the flow of liquid in a pipeline, particularly for the measurement of the fuel being supplied to a combustion engine in a vehicle.

In our Patent No. GB 1492374 there is disclosed a flowmeter which comprises a bore through which the liquid flows, a rotor with helical vanes mounted within the bore to be rotated by the liquid flowing therethrough, and a light source and photo-sensitive element so arranged at opposite sides of the bore that the light beam transmitted from the source to the photo-sensitive element is interrupted by the vanes of the rotor as it rotates. Due to the fluctuations in the intensity of the light-beam received by the photo-sensitive element this element produces a pulsating electrical output signal, and as the speed at which the rotor is rotated depends on the liquid flow rate the frequency of the output signal is indicative of the flow rate of liquid through the transducer.

The electrical signal derived from the photo-sensitive element may be processed by suitable electronic circuitry to provide by means of a suitable display device an output indicating the total flow and/or the flow rate e.g. in gallons per hour. Furthermore, in the case of measuring the flow of fuel to a vehicle combustion engine the transducer output can be utilised in producing a miles per gallon reading to enable the driver to monitor continuously the efficiency with which the vehicle is being driven.

For many applications the known flowmeter of our earlier patent produces entirely satisfactory results. When used for measurement of fuel to a combustion engine, however, there are two main factors which influence its operation reducing its efficiency and accuracy.

If any bubbles are entrained with the liquid flowing through the transducer they can interrupt the light path between the light source and the photo-sensitive element with the result that an inaccurate output signal is obtained. Air can be entrained with the fuel in a vehicle fuel line, especially if the vehicle is running with a low level of fuel in the tank. Furthermore, as the fuel is volatile vapour bubbles are easily formed in the fuel line itself. Both air and vapour bubbles will interfere with the transducer performance.

The present invention aims to provide a flowmeter which has as its main object to eliminate or substantially reduce the above disadvantage and accordingly there is provided a fluid flow measuring device comprising a transducer including a vaned rotor received in a bore to be rotated by the fluid flowing through the bore, and a light source and a photosensitive element mounted at opposite sides of the bore for the light path therebetween to be interrupted intermittently by the rotor vanes as the rotor rotates, characterised in that the bore axis is substantially vertical, and a separation chamber is provided upstream of the transducer for separating gas and vapour from the liquid, the chamber having an inlet, an outlet for separated gas and vapour positioned above the inlet, and an outlet for liquid positioned below said gas and vapour outlet, the liquid outlet being connected to the lower end of the transducer bore whereby the liquid flows upwardly through the transducer.

The gas separation chamber serves to separate any air or vapour from the liquid entering the device, and mounting it in close proximity to the transducer minimises the chances of the liquid vapourising between the swirl chamber and the transducer. Furthermore, arranging the transducer substantially vertically means that gravity will oppose any tendency for vapour bubbles created downstream of the transducer to flow back to the rotor in counterflow to the liquid, and if any bubbles should enter the transducer they will be carried rapidly past the rotor and have minimal effect on the transducer performance.

The second problem associated with the measurement of fuel flow in a vehicle is that the transducer is unable to distinguish between forward and return flow, and in many fuel supply systems reverse pulses are frequently experienced either due to the type of fuel pump used or because vapour pockets form in the fuel line upstream of the carburettor. The reverse pulses are registered by the transducer in the same way as forward flow with the result that the fuel consumption recorded may be much higher than the true figure.

Therefore, a preferred device in accordance with the invention is also provided with means to prevent return flow of liquid through the transducer. This means preferably takes the form of a lightly sprung non-return valve which may be located at either the inlet or outlet of the transducer.

A more complete understanding of the present invention will be had from the following detailed description which is given by way of example with reference to the accompanying drawings, in which.

Figure 1:
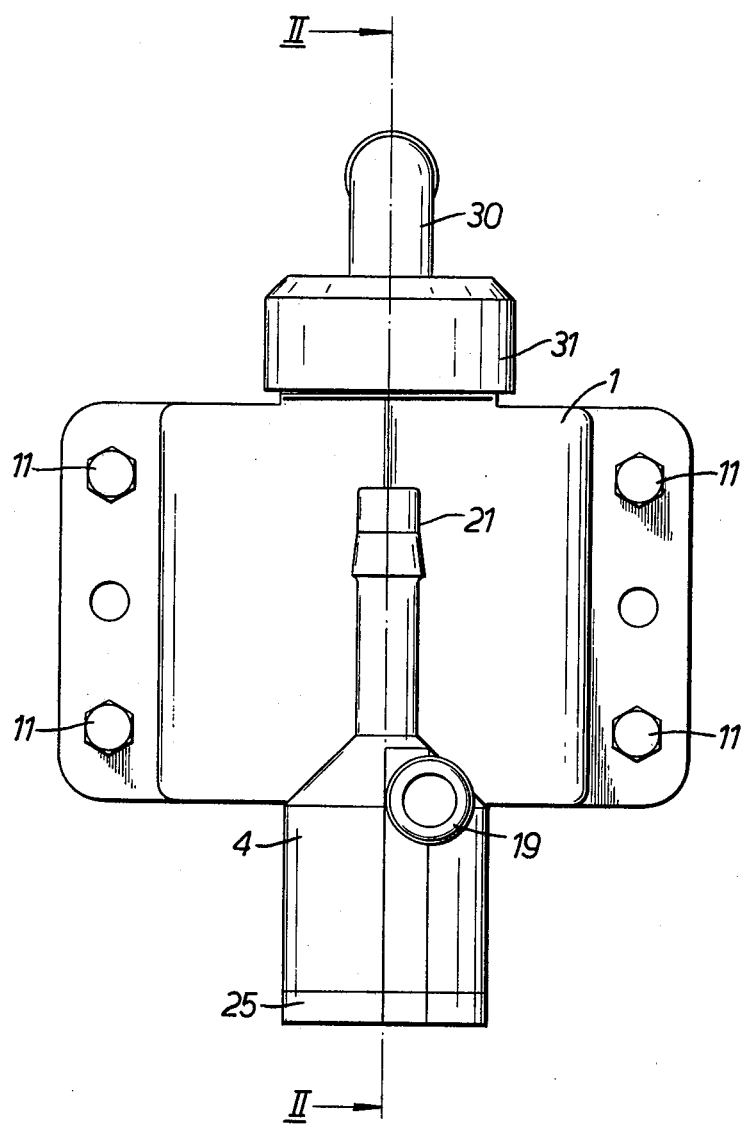
FIG. 1 shows a flowmeter embodying the invention in side view.
Figure 2:
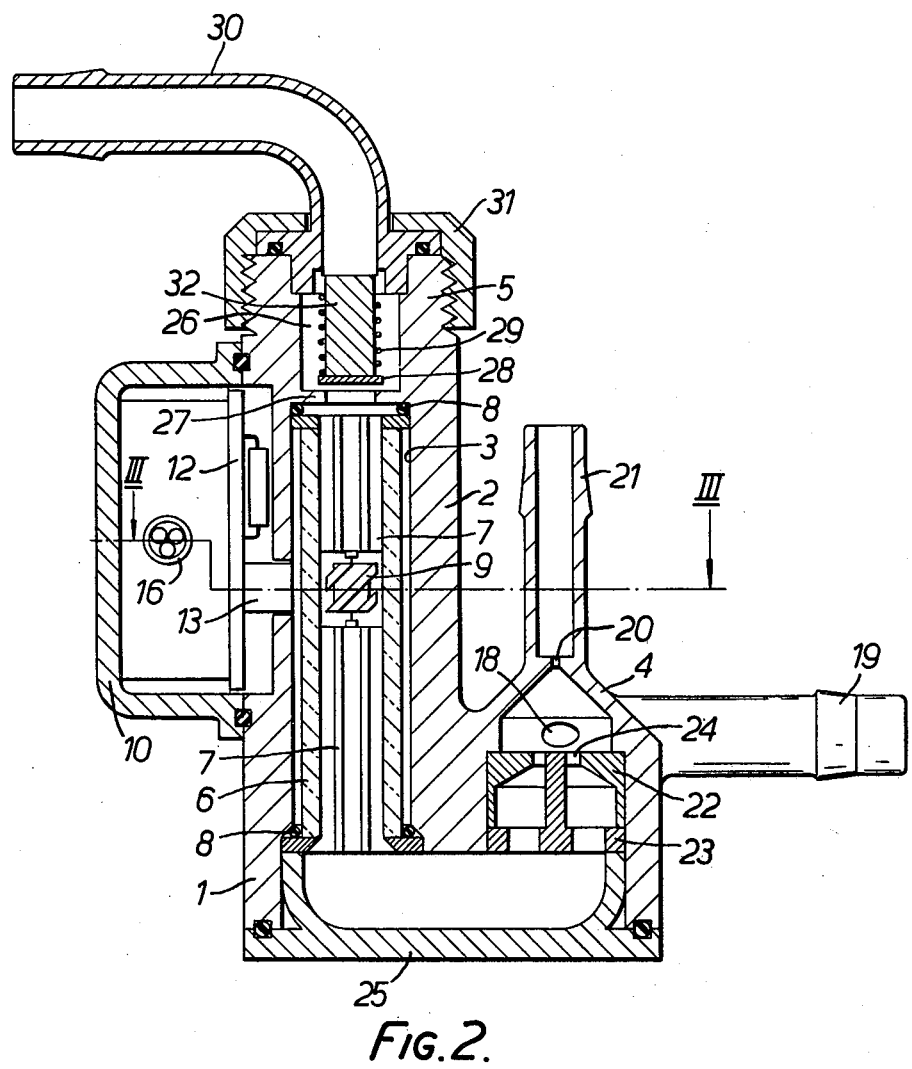
FIG. 2 is a section taken along the line II—II in FIG. 1.
Figure 3:
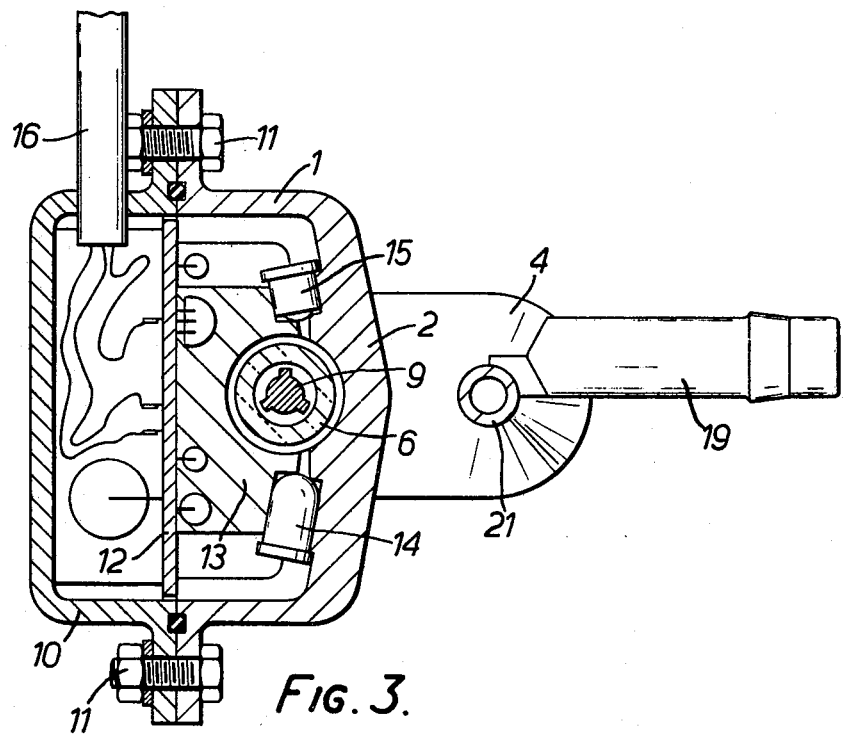
FIG. 3 is a section taken along the line III—III in FIG. 2.

The flowmeter illustrated in FIGS. 1 to 3 comprises a body 1 defining a transducer housing 2 with a vertical bore 3, a swirl chamber housing 4 with a vertical axis and in close proximity to the transducer housing, and a valve housing 5. The transducer is of essentially the same form as described in Patent No. GB 1492374 and includes a glass tube 6 inserted in the bore 3, a pair of flow straightening inserts 7 fitted into either end of the tube 6 and sealed to the body by seals 8, and a helically vaned rotor or turbine 9 journalled in jewel bearings for rotation between the inner ends of the inserts 7. A cover 10 is secured to the body 1 by nuts and bolts 11 and encloses therewith a chamber in which an electric circuit board 12 is received. In addition to various electrical components the circuit board carries a yoke 13 which embraces the tube 6 in the region of the turbine and supports a small light bulb 14 and a photo-sensitive element 15 at opposite sides of the tube 6 so that the light path between them will be interrupted by the turbine vanes when the turbine is rotated. An electric cable 16 passes through the cover for supplying electric power to the transducer and conducting the output signal to the associated equipment.

The swirl chamber includes a cylindrical part with a tangential inlet 18 connected to the flowmeter inlet tube 19, and a conical part tapering upwardly to a small diameter outlet port 20 communicating with a return outlet tube 21 which in use of the flowmeter is connected to the fuel tank by a hose or the like. A pair of inserts 22, 23 are received in body 1 and together define an annular liquid port 24 leading downwardly from the swirl chamber. The first insert 22 diverges conically downwardly from the outlet port to ensure gradual expansion of the liquid passing through the port so that the risk of the liquid vapourising is reduced. The central post of the second insert 23 serves to support the vapour column formed at the centre of the swirl chamber to prevent vapour becoming re-entrained with the liquid flowing out of the swirl chamber. The vapour outlet 20 from the swirl chamber has only a small diameter so that the amount of liquid fuel recycled to the tank during periods when very little air or vapour enters the flow meter is kept very low.

A bottom cover 25 is fixed to the body 1 in a sealed manner and confines with it a passageway communicating the liquid outlet port 24 of the swirl chamber with the lower inlet end of the transducer. The corners of the passageway are smoothly rounded to reduce turbulence and hence the chances of the fuel vapourising in this passageway.

The bore 3 of body 1 is separated from a valve chamber 26 by an annular flange 27, the upper surface of which acts as a valve seat co-operating with a disc-like valve member 28 which is biased downwardly by a light coil spring 29. A tubular outlet fitting 30 is connected to the valve housing part of body 1 by a collar 31 and includes a central column 32 depending downwardly into the valve chamber 26 to serve as a support for spring 29 and a stop limiting the upward movement of the disc 28. Thus, the disc 28 and flange 27 together constitute a non-return valve to eliminate any reverse flow from top to bottom through the transducer, but permitting substantially unimpeded forward flow.

In use the flowmeter is connected in the fuel line between the fuel pump and the carburettor and the vapour outlet connection 21 is connected to the tank by a vapour return line. The fuel entering the swirl chamber rotates therein and establishes a vortex due to the tangential inlet 18, and any air or vapour entrained with the vapour gravitates to the centre of the chamber and is discharged through the port 20 to be returned to the tank. The liquid fuel now free of any air or vapour bubbles passes through port 24 and to the inlet side of the transducer. The liquid fuel flows up through the bore of the glass tube 6 and causes the turbine 9 to rotate at a speed which is dependent upon the liquid flow through the transducer. As the turbine rotates its vanes interrupt the light beam transmitted from the bulb 14 to the photo-sensitive element 15 so that a pulsating electric output signal is obtained having a frequency dependent upon the turbine speed and hence the liquid flow rate. The fuel then flows through the non-return valve 27, 28 to the flowmeter outlet 30.

The flowmeter construction is such that its accuracy is not significantly impaired by bubbles or reverse flow pulses. The swirl chamber removes any bubbles in a simple and efficient manner and by positioning it in juxtaposition to the transducer the risk of the liquid vapourising in the passageway connecting them is minimised. As the transducer axis is vertical and the liquid flows upwardly therethrough the risk of any bubbles created downstream travelling against the liquid flow to the transducer is practically eliminated. Furthermore, if any bubbles should happen to enter the transducer they will be conducted rapidly away with the liquid so that there is no risk of them collecting in the region of the turbine. The non-return valve is effective to prevent any reverse flow from top to bottom through the transducer. If preferred the valve could be located at the inlet side of the transducer.

Figure 4:
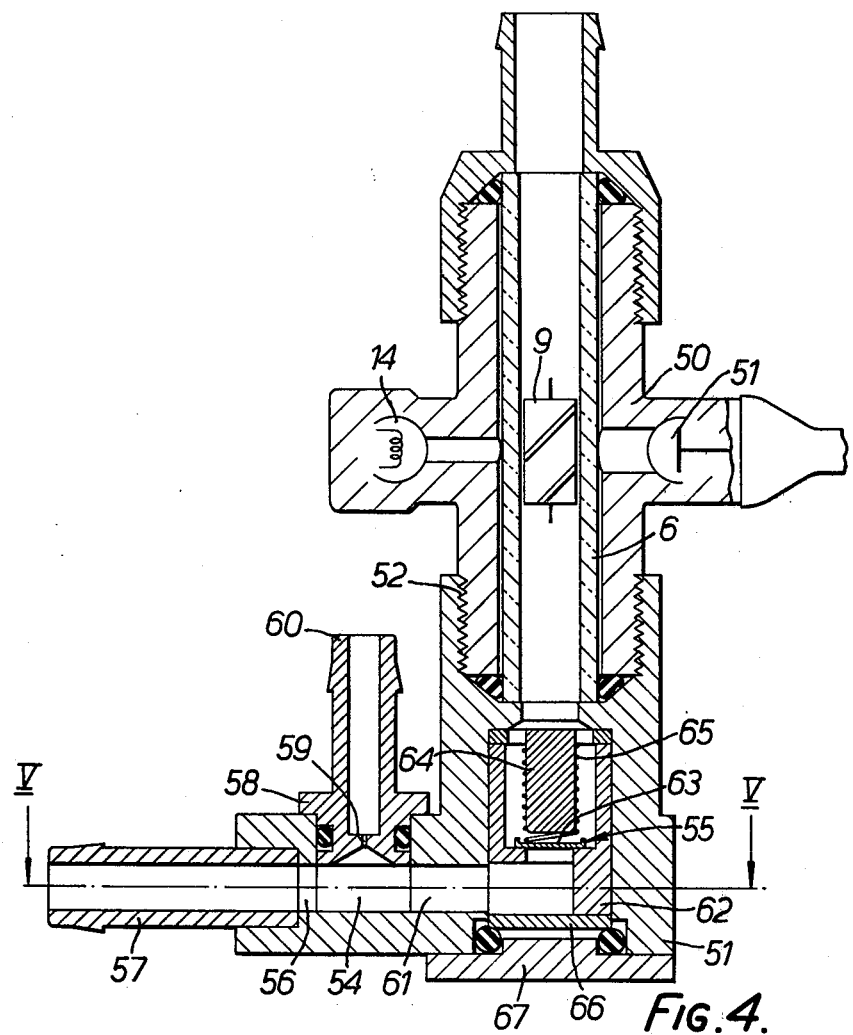
FIG. 4 is a side view shown partly in cross-section of another embodiment of the invention.
Figure 5:
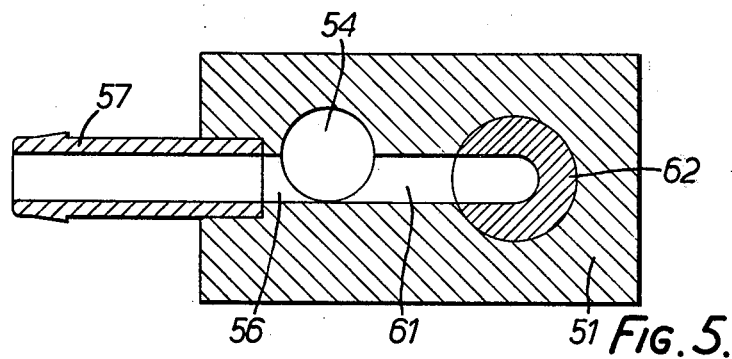
FIG. 5 is a section taken along the line V—V in FIG. 4.

An alternative embodiment of the invention is illustrated in FIGS. 4 and 5. The flowmeter has a body made in two parts 50, 51 which are firmly connected together by a screw-threaded connection 52. The upper body part 50 defines a transducer housing. The internal details of the transducer have been shown only schematically in FIG. 4 since they are essentially the same as in the flowmeter of FIGS. 1 to 3, a turbine 9 being journalled between flow straightening inserts within a vertical glass tube 6 accommodated in and sealed to the housing, and a light source 14 and photo-sensitive device 15 being mounted at opposite sides of the tube for the light path therebetween to be interrupted by the turbine vanes as the turbine is rotated.

The lower body part 51 defines a housing for a gas separation chamber 54 and a non-return valve 55. The body part 51 includes an inlet passageway 56 fitted with a tube connector 57 and leading into the chamber 54. The chamber 54 is defined by a cylindrical recess in the body 51 which is closed by a member 58 defining a conical recess at the top of the chamber leading to a small-diameter vapour outlet port 59. The member 58 includes an integral connector 60 for attachment of a tube for conducting vapour and gas discharged through the outlet 59 back to tank. An outlet passageway 61 leading from chamber 54 is aligned with the inlet passage 56 and both passageways 56, 61 are essentially tangential to the chamber. This form of gas separation chamber has the advantage of producing only a small pressure drop in the fuel line, yet the degree of swirling obtained in the chamber has been found to produce satisfactory elimination of bubbles from the flow.

The passageway 61 leads to a valve chamber defined by a bore in the body 51. Inserted in this bore are a valve seat member 62, a valve member 63, and a stop element 64 for limiting upward movement of the valve member 63 and for supporting a light coil spring 65 which biases the valve member towards the seat. The outer end of the bore is closed by a clamp plate 66 and a sealed cover 67. An outlet 68 of the valve chamber opens into the lower, inlet end of the transducer. The fuel flowing through the valve in the direction from the gas separation chamber 54 to the transducer normally holds the valve 55 open, but reverse flow through the transducer is prevented by the valve closing.

The operation of the flowmeter shown in FIGS. 4 and 5 will be understood from the above description given in relation to the embodiment of FIGS. 1 to 3 and further explanation is not thought necessary.

We claim:

1. A liquid flow measuring device comprising a transducer having a substantially vertical bore with upper and lower ends, a vaned rotor received in said bore and rotatable by the liquid flowing through the bore, and a light source and a photosensitive element mounted at opposite sides of the bore, a light path between said light source and said photosensitive element being interrupted intermittently by the rotor vanes when the rotor is rotated, means defining a separation chamber for separating gas and vapour from the liquid flow, said chamber having an inlet, an outlet for separated gas and vapour positioned above said inlet, and an outlet for liquid positioned below said gas and vapour outlet, and a passageway connecting said liquid outlet to said lower end of the transducer bore whereby the liquid flows upwardly through the transducer after leaving the separation chamber.

2. A device according to claim 1, wherein the transducer and the separation chamber are mounted in close proximity to each other and have housings formed by a common body.

3. A device according to claim 2, wherein said body defines said passageway connecting the liquid outlet from the separation chamber to the lower end of the transducer bore.

4. A device according to claim 2, wherein the separation chamber has upper and side walls defined by the body, and a bottom wall provided by a member inserted in the body.

5. A device according to claim 4, wherein the insert member defines the liquid outlet and a portion of said passageway, said passageway portion diverging away from the outlet to permit gradual expansion of the liquid passing through the outlet.

6. A device according to claim 4, wherein said transducer bore accommodating the rotor is defined by a transparent tube received in the body and sealed to the body at the tube ends, and a cover is fitted to the body and holds the tube and insert member in position within the body.

7. A device according to claim 2, wherein the body comprises upper and lower parts firmly connected together, the upper part providing the transducer housing, and the lower part including separation chamber, and a non-return valve provided in the lower body part and is arranged between the separation chamber and the transducer to prevent reverse flow of fluid downwardly through the transducer bore.

8. A device according to claim 1, including a non-return valve located at one end of the transducer bore to prevent reverse flow of fluid downwardly through the transducer bore.

9. A device according to claim 8, wherein the valve is positioned at the upper end of the transducer bore and comprises a valve member, a valve seat defined by an annular shoulder formed in the transducer housing, and a light spring urging the valve member against the seat.

10. A device according to claim 1, wherein the separation chamber has a top wall which converges smoothly to the outlet for gas and vapour, and the area of said outlet is substantially smaller than that of the inlet and that of the liquid outlet whereby to restrict flow of liquid therethrough.

11. A device according to claim 10, wherein the separation chamber is cylindrical and the liquid inlet and liquid outlet are aligned with each other and offset with respect to the chamber axis.

12. A device according to claim 1, wherein the separation chamber is a swirl chamber.

13. A device according to claim 12, wherein the liquid outlet of the swirl chamber is annular and coaxial with the chamber.

* * * * *